United States Patent Office 2,872,293
Patented Feb. 3, 1959

2,872,293

STABILIZING HYDROGEN PEROXIDE

Edward M. Roth, Jr., Kenmore, N. Y., assignor, by mesne assignments, to Food Machinery and Chemical Corporation, San Jose, Calif., a corporation of Delaware No Drawing. Application March 18, 1953
Serial No. 343,245

1 Claim. (Cl. 23—207.5)

This invention pertains to the preparation of a stabilizer for solutions containing hydrogen peroxide, to a method of stabilizing hydrogen peroxide and, more particularly, to the preparation of a stannate stabilizer for such solutions.

The need to stabilize solutions containing hydrogen peroxide to prevent active oxygen loss during processing, shipping and storing, has been recognized for many years. Although numerous organic and inorganic stabilizers and various stabilizing methods have become known to the art, modern practice has come to recognize the pyrophosphate and stannate, or stannate containing stabilizers, as among the most efficient stabilizer types. Indeed, stabilizers of this type, as described by Reichert 1,958,204, Gilbert 2,004,809, Gilbert 2,091,178 and Reichert 2,426,154, as well as the stabilizing methods disclosed by these patents, perform very well under ordinary conditions encountered in handling solutions containing hydrogen peroxide.

However, presently available stannate type stabilizers are not completely satisfactory in some respects. If a stannate solution is added to solutions containing hydrogen peroxide to serve as the sole stabilizing agent, clouding of the solution due to formation of insoluble precipitates is very apt to occur. If pyrophosphates, which have a stabilizing effect of their own, are added to prevent formation of precipitates, as described by Reichert 1,958,204, the stabilizing efficiency of the stannate is found to decrease. Hydrogen peroxide solutions stabilized in this manner, upon prolonged storage in the commonly used aluminum containers, are found to exert, on occasion, a corrosive effect on the container. This is evidenced not only in pitting of the container wall, but also results in reduced stability of the hydrogen peroxide solution thus stored. Although the exact mechanism of this corrosive attack is not known, it is a familiar phenomenon well known to the hydrogen peroxide manufacturers.

Another disadvantage of presently available stannate type stabilizers is the fact that if they be used to stabilize a more concentrated hydrogen peroxide solution and this solution be subsequently diluted with water, the resulting dilute hydrogen peroxide solution will be less stable than the original, more highly concentrated solution. This fact might be due to stabilizer dilution or to introduction of catalytically active impurities during the dilution step, but regardless of its mechanism, it requires addition of further amounts of stabilizer properly to protect the dilute hydrogen peroxide solution from objectionable decomposition. This is of considerable practical interest because large quantities of concentrated hydrogen peroxide are purchased and subsequently diluted and bottled for resale. Such diluted product must possess an acceptable shelf life even though storage conditions thereof be adverse.

It is therefore an object of this invention to provide a method of preparing an efficient stannate type stabilizer for hydrogen peroxide solutions.

It is a further object of this invention to provide a method of preparing a stannate type stabilizer free of adjuncts apt to reduce stabilizer efficiency.

Another object of this invention is to prepare a stannate type stabilizer which will prevent objectionable interaction between the stabilized hydrogen peroxide solution and an aluminum container.

Still another object of this invention is to prepare a stannate type stabilizer which will maintain the original stability level of a so stabilized hydrogen peroxide solution upon long term storage in aluminum containers.

A further object of this invention is to prepare a stannate type stabilizer which will maintain the original stability level of a so stabilized hydrogen peroxide solution even after diluting the hydrogen peroxide solution to a substantially lower concentration.

It is also an object of this invention to prepare a stannate type stabilizer suitable for stabilization of alkaline hydrogen peroxide process solutions.

It is also an object to provide a method of stabilizing hydrogen peroxide against the adverse influences of dilution with water.

I have now found that these and other objects of my invention are accomplished if a relatively concentrated stannate type stabilizer solution is prepared by dissolving a stannate first in relatively concentrated hydrogen peroxide and then adjusting the pH of the resulting stabilizer solution with acid to substantially pH 5. This solution, when added to unstabilized hydrogen peroxide, produces better stabilities per unit of tin than addition of an aqueous stannate solution directly to the peroxide to be stabilized.

The performance data given in the subsequent Tables 1 to 4 make it very clear that the stabilizing properties of a stannate type stabilizer are profoundly influenced by the chemical nature of the solvent medium in which the stabilizer is prepared. The complex physico-chemical properties of tin compounds are responsible for the fact that, depending on conditions, solutions of these compounds may contain the tin compound in molecular, colloidal or macro-disperse form. This last form is clearly undesirable because, quite aside from its ordinarily low stabilizing efficiency, macro-disperse particles produce more or less pronounced turbidity or even precipitate in the solvent medium; in the present case, the stabilizer containing hydrogen peroxide solution. Relatively low stabilizing effects are observed in the non-turbid hydrogen peroxide solutions containing the tin compound in molecular dispersion, as results from the use of water as the solvent medium for the tin compound. The surprisingly high efficiency of the stannate-peroxide type stabilizer of this invention is presumably due to the particular and critical micelle size obtained by reducing the water activity in the solvent medium by substituting hydrogen peroxide for the water ordinarily employed. That reduction of water activtiy is an important factor is borne out by the finding that the hydrogen peroxide concentration in the solvent medium has to be at least of the order of 20%, in order to obtain the desired effects.

In short, there is reason to believe that the tin compound involved in preparing stannate type stabilizers is obtained in different physical form and different stabilizing properties depending on whether water or hydrogen peroxide solutions are used as the solvent medium.

In the preparation of the concentrated stannate-peroxide stabilizer solution of my invention, I prefer to use sodium stannate trihydrate as the tin compound, for reasons of availability, purity and solubility.

The relatively concentrated hydrogen peroxide solution used in my invention, as the solvent medium for the stannate, may have an $H_2O_2$ content of between about 20% and 50% by weight, although higher concentrations may be used. For convenience sake, the use of commercial hydrogen peroxide solutions of 27.5% or 35% concentration by weight is preferred, and I prefer to use the hydrogen peroxide solution as produced; that is to say, not yet containing any stabilizing agents, so as to avoid unnecessary, and possibly objectionably high residues in the hydrogen peroxide solutions as stabilized with the stabilizer of my invention.

The usual acids found suitable for adjusting the pH of hydrogen peroxide solutions may be used to adjust the pH of the solution resulting from dissolving sodium stannate trihydrate in hydrogen peroxide of 20 to 50% concentration. Examples of such acids are citric, lactic, malic, gluconic, glycolic and phosphoric acid. For reasons of cost and availability I prefer to use phosphoric acid.

The following is an example of the exceedingly simple procedure required to prepare the stannate type stabilizer of this invention, the most critical and distinguishing feature being the dissolution of the tin compound used in a relatively concentrated hydrogen peroxide solution which serves as the solvent medium.

EXAMPLE 1

100 grams of sodium stannate trihydrate $$Na_2SnO_3 \cdot 3H_2O$$

of C. P. grade was dissolved at room temperature and with slight stirring in approximately 900 grams of a 35% solution of unstabilized hydrogen peroxide to give about 1000 grams of an approximately 10% sodium stannate solution. The pH of the resulting solution was found to be about 7.5 to 8.0 and was adjusted by adding slowly and with constant stirring, the required amount of concentrated phosphoric acid, to result in a solution having a pH of about 5.0. The solution thus prepared is immediately ready for use as stabilizer for a hydrogen peroxide solution.

If preferred, a somewhat more concentrated stabilizer solution may be prepared. However, for ordinary practice, an approximately 10% stabilizer solution will be found to be convenient.

Prior to adding the stabilizer solution to the hydrogen peroxide solution to be stabilized, I prefer to adjust the unstabilized hydrogen peroxide solution to about pH 2.5 to 2.7 by adding an alkali such as ammonium hydroxide. This pH adjustment serves to prevent precipitation of any tin compound with ensuing cloudiness in the stabilized hydrogen peroxide solution.

Following the pH adjustment, the stannate-peroxide stabilized solution is added slowly and with stirring to the hydrogen peroxide solution to be stabilized. After addition and uniform distribution of the stabilizer solution, the thus stabilized hydrogen peroxide solution may then be further adjusted, if desired, to the commonly preferred range of pH 3.5 to 4.0.

The amount of stabilizer added is preferably about 10 mg. to 1000 mg. of sodium stannate per liter of resultant hydrogen peroxide solution.

The following tables show the effectiveness of my stannate type stabilizer under various test conditions and will also show its superiority over a stannate type stabilizer which is introduced into the hydrogen peroxide solution to be stabilized in form of a stannate solution in water, as contrasted to my stabilizer, which is introduced in form of a solution in hydrogen peroxide.

As pointed out above, one of the important requirements for a hydrogen peroxide stabilizer is that it will permit substantial dilution of a hydrogen peroxide solution thus stabilized, with production of a diluted solution of substantially equal stability. This is demonstrated by the data of Table 1.

Table 1

[Percent loss per year at room temperature of hydrogen peroxide solutions before and after dilution, kept in glass.]

| Sample | mg. Sodium Stannate per liter | Type of Solution | Percent $H_2O_2$ Loss per year |
|---|---|---|---|
| A | 100.0 | $H_2O_2$ 35%, water solution of stannate stabilizer added. | 1.0 |
| B | 15.5 | $H_2O_2$ 35%, stabilized as in A and diluted to 6% $H_2O_2$. | 40.3 |
| C | 96.5 | $H_2O_2$ 35%, stannate-peroxide solution of stabilizer added. | 1.0 |
| D | 15.0 | Sample C after dilution to 6% $H_2O_2$ concentration. | 2.2 |

The superior stabilizing effect of the stabilizer of this invention is clearly shown by the critical and much improved stabilizing effect after dilution of the stabilized concentrated hydrogen peroxide solution, as shown in samples C and D above.

Peroxide stability is also affected by possible interaction between the solution and aluminum upon commercial storage in the commonly used aluminum drums. Here, again, the stabilizer of this invention gives improved results as shown in the following Table 2.

Table 2

[Percent loss per year at room temperature of hydrogen peroxide solutions before and after dilution, the concentrated solution having been stored in aluminum containers for at least two weeks.]

| Sample | mg. Sodium Stannate per liter | Type of Solution | Percent $H_2O_2$ Loss per Year |
|---|---|---|---|
| E | 100.0 | $H_2O_2$ 35%, water solution of stannate stabilizer added. | 1.8 |
| F | 15.5 | Sample E after dilution to 6% $H_2O_2$ concentration. | 47.1 |
| G | 96.5 | $H_2O_2$ 35%, stannate-peroxide solution of stabilizer added. | 1.0 |
| H | 15.0 | Sample G after dilution to 6% $H_2O_2$ concentration. | 2.2 |

These data clearly show that deleterious "drum effects" on peroxide stability, particularly after dilution, are substantially reduced by the stabilizer of this invention, as contrasted to a conventional type of stannate stabilizer.

A conventional test for peroxide stability consists in keeping the sample under test for 24 hours at a temperature of 100° C. and then determining the peroxide loss of the sample. The following Table 3 shows the superior performance of the stabilizer of this invention when tested in accordance with that method.

Table 3

[Percent loss in 24 hours at 100° C. of hydrogen peroxide solutions before and after dilution, the concentrated solution having been stored in aluminum containers for at least two weeks.]

| Sample | mg. Sodium Stannate per liter | Type of Solution | Percent $H_2O_2$ Loss |
|---|---|---|---|
| I | 100.0 | $H_2O_2$ 35%, water solution of stannate stabilizer added. | 3.4 |
| J | 15.5 | Sample I after dilution to 6% $H_2O_2$ concentration. | 22.8 |
| K | 96.5 | $H_2O_2$ 35%, stannate-peroxide solution of stabilizer added. | 0.5 |
| L | 15.0 | Sample K after dilution to 6% $H_2O_2$ concentration. | 0.6 |

These data clearly show the exceptionally high improvement in the stability, particularly of the diluted hydrogen peroxide solutions obtained by using the stabilizer of this invention, by first preparing a relatively concentrated solution in hydrogen peroxide, as compared to the preparation of water solution of sodium stannate and addition of such solution to the peroxide to be stabilized.

The stabilizer of this invention is also suitable to protect alkaline hydrogen peroxide process solutions from objectionable decomposition. Such process solutions are of importance, for example, in the manufacture of sodium perborate. A typical process solution from which sodium perborate would be recovered by precipitation would be composed of about 137 liter of distilled water, 48 liter of a saturated solution of sodium metaborate and 15 liter of a 50% solution of hydrogen peroxide. To insure satisfactory yields of sodium perborate, that is, to avoid hydrogen peroxide losses through decomposition in the course of processing, addition of a stabilizer is advisable, particularly to counteract the catalytic effects of unavoidable traces of iron present in the solution.

The following Table 4 shows the excellent effects obtained by using the stabilizer of this invention with such process solutions containing 0.1 and 1 part per million of iron respectively. Here the stability test consisted of determining percent loss of active oxygen after keeping the sample for two hours at 60° C.

Where data are given herein of the pH of a solution, such data were determined by direct immersion of the glass electrode of a pH meter in the solution, the pH of which was to be determined.

What is claimed is:

In the method of stabilizing aqueous hydrogen peroxide with sodium stannate the improvement which comprises adjusting the pH of the aqueous hydrogen peroxide to be stabilized to about pH 2.5 to 2.7 and then adding thereto a solution of sodium stannate in hydrogen peroxide the pH of which solution is about pH 5, said solution containing about 10% of sodium stannate and prepared by dissolving the sodium stannate in unstabilized hydrogen peroxide of at least 20% concentration, the amount of said solution added being sufficient to produce a concentration per liter in the resultant mixture of 10 milligrams to 1000 milligrams of sodium stannate.

*Table 4*

| Parts per million Fe in process Solution | Amount of Stabilizer added in gram of sodium stannate per liter of solution | Percent loss in peroxide after 2 hours at 60° C. |
|---|---|---|
| 0.1 p. p. m. Fe | none | 11.0 |
| 0.1 p. p. m. Fe | 1.0 | 4.5 |
| 1.0 p. p. m. Fe | none | 96.2 |
| 1.0 p. p. m. Fe | 1.0 | 9.5 |

References Cited in the file of this patent

UNITED STATES PATENTS 1,958,204   Reichert _____ May 8, 1934